(12) United States Patent
Itou (10) Patent No.: US 6,212,370 B1
(45) Date of Patent: *Apr. 3, 2001

(54) RADIO RECEIVER FOR SELECTIVE CALLING

(75) Inventor: Hideaki Itou, Tokyo (JP)

(73) Assignee: Kokusai Electric Co., Ltd., Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/917,563

(22) Filed: Aug. 26, 1997

(30) Foreign Application Priority Data

Aug. 26, 1996 (JP) ................................... 8-224215

(51) Int. Cl.$^7$ ..................................................... H04B 1/16
(52) U.S. Cl. ........................................... 455/343; 455/38.3
(58) Field of Search ................................... 455/38.2, 38.3, 455/38.4, 38.5, 12.1, 343, 502, 503; 340/825.44

(56) References Cited

U.S. PATENT DOCUMENTS

| | | | |
|---|---|---|---|
| 5,355,518 | * 10/1994 | Kindinger et al. | 455/343 |
| 5,363,377 | * 11/1994 | Sharpe | 455/502 |
| 5,416,808 | * 5/1995 | Witsaman et al. | 455/503 |
| 5,739,762 | * 4/1998 | Kuramatsu et al. | 455/38.2 |

* cited by examiner

Primary Examiner—Reinhard Eisenzopf
Assistant Examiner—Sam Bhattacharya
(74) Attorney, Agent, or Firm—Jacobson, Price, Holman & Stern, PLLC (57) ABSTRACT

Provided is a radio receiver for selective calling that improves the efficiency of a battery saving function and that can reduce the possibility that an incorrect time will be displayed. According to the radio receiver for selective calling of the present invention, when a controller receives input time information from a reception section, it compares the time indicated by the time information and time indicated by a clock. When the two times match, for a subsequent specified period of time the controller does not turn on the reception section, even at the time of transmission of time information. When the times do not match, the clock is adjusted to reflect the time indicated by the time information.

9 Claims, 6 Drawing Sheets

FIG.4A  FRAME

FIG.4B  TIME INFORMATION TRANSMISSION TIMING

FIG.4C  TIME INFORMATION RECEPTION TIMING

FIG.5

FIG.6A
(PRIOR ART)
FRAME

FIG.6B
(PRIOR ART)
TIME INFORMATION
TRANSMISSION TIMING

FIG.6C
(PRIOR ART)
TIME INFORMATION
RECEPTION TIMING

RADIO RECEIVER FOR SELECTIVE CALLING

BACKGROUND OF THE INVENTION

1. Field of the Invention

The present invention relates to a radio receiver for selective calling that receives time information by radio and corrects the time of an incorporated clock, and in particular to a radio receiver for selective calling that can save on battery usage and can reduce the possibility that an incorrect time will be received and displayed.

2. Related Arts

Some systems for a radio receiver for selective calling periodically receive time information by radio.

Figure 6A:
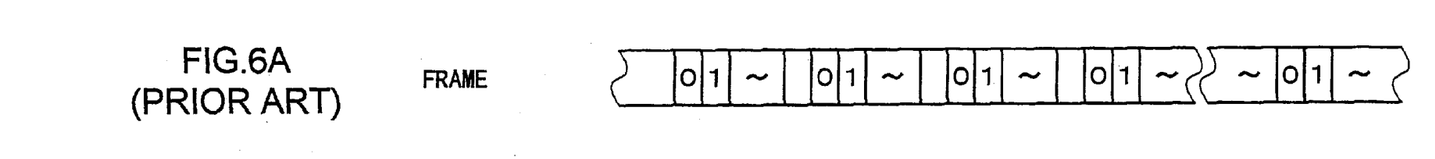
FIG. 6 is a timing chart showing time correction timing for a conventional radio receiver for selective calling.
Figure 6B:
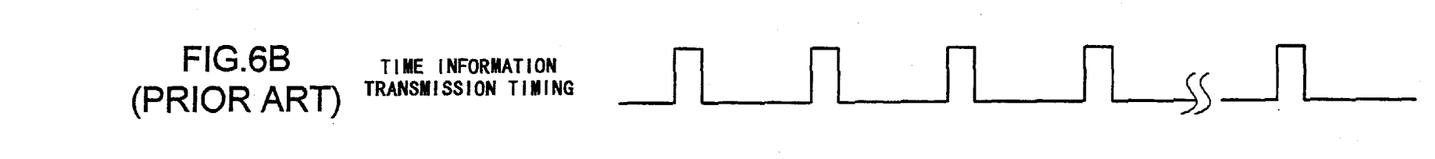

FIG. 6 is a timing chart showing the timing for time corrections employed for a conventional radio receiver for selective calling. Time information is transmitted in the frame "0," shown in FIG. 6A, the processing for this being shown in FIG. 6B. Other information is transmitted in the other frames.

Figure 6C:
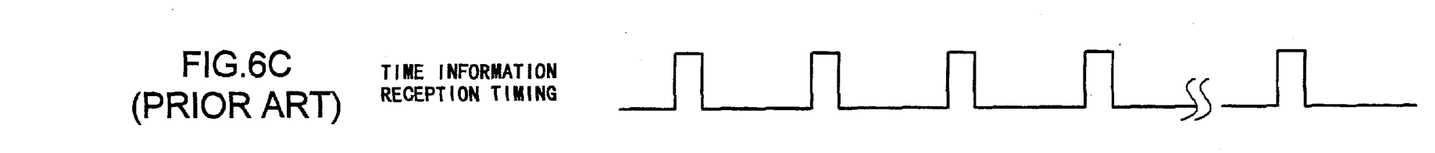

Conventionally, a radio receiver for selective calling receives time information in each time frame "0" is transmitted, and corrects the time displayed by an incorporated clock, as is shown in FIG. 6C.

For a current radio receiver for selective calling, generally a technique called a battery saving function is employed in order to extend the service life of an incorporated battery.

According to this technique, a frame for self-calling is determined in advance to be frame "27," for example, and at a time other than the time of transmission of frame "27," the radio receiver for selective calling disconnects a power supply for a reception section or the like.

In the conventional radio receiver for selective calling, however, the power source for the reception section is turned on upon each transmission of time information (frame "0"), in addition to the transmission time for the frame for self-calling. As a result, the efficiency of the battery saving function is deteriorated.

In addition, since the time is corrected upon each transmission of time information, time correction is constantly performed in an area where a reception barrier occurs, even when incorrect time information is received, so that an incorrect time is frequently displayed.

SUMMARY OF THE INVENTION

It is, therefore, one object of the present invention to provide a radio receiver for selective calling that provides improved efficiency for a battery saving function during time correction, and that can reduce the possibility that incorrect time information will be received and displayed.

To achieve the above object, according to the present invention, provided is a radio receiver for selective calling, which has a clock and which periodically receives time information and corrects the time displayed by the clock, wherein the time information is not received for a predetermined period of time following a correction of the time displayed by the clock. As a result, the efficiency of a battery saving function is enhanced and the possibility that an incorrect time will be displayed can be reduced.

In addition, according to the present invention, provided is a radio receiver for selective calling, which has a clock and which periodically receives time information and corrects the time displayed by the clock, wherein the time information is compared with the time displayed by the clock and wherein, when the time information matches the time of the clock, reception of the time information is halted for a predetermined period of time, or when the time information does not match the time of the clock, the time displayed by the clock is corrected. As a result, the efficiency of a battery saving function can be enhanced, and even when time information indicating an incorrect time arrives during a period in which the reception of the time information is halted, the correct time can be displayed and the possibility that an incorrect time will be displayed can be reduced.

Further, according to the present invention, provided is a radio receiver for selective calling, which has a clock and which periodically receives time information and corrects time displayed by the clock, wherein the time information that is received is compared with the time displayed by the clock, and wherein, when the time information matches the time of the clock, correction for the time displayed by the clock is not performed for a predetermined period of time, or wherein, when the time information does not match the time of the clock, the time displayed by the clock is corrected. As a result, the efficiency of a battery saving function can be enhanced and the possibility that an incorrect time will be displayed can be reduced.

Furthermore, according to the present invention, provided is a radio receiver for selective calling, which has a clock and which periodically receives time information and corrects time displayed by the clock, wherein the time information that is received is examined to determine whether the time information contains an error, and wherein, when the time information contains an error that is large enough to require correction, the time information is corrected and the time of the clock is corrected based on the corrected time information, or wherein, when the time information contains no error, reception of the time information is halted for a predetermined period of time. As a result, the possibility that an incorrect time will be displayed can be reduced.

Also, to achieve the object, according to the present invention, a radio receiver for selective calling that periodically receives time information to correct time displayed by a clock comprises:

the clock;

a reception section for receiving, when powered on, an incoming signal, and for demodulating the signal and outputting a resultant signal to a controller; and the controller for, upon receipt of the time information from the reception section, comparing the time information with the time displayed by the clock, and for, when time indicated by the time information does not match the time displayed by the clock, correcting and adjusting the clock to reflect the time indicated by the time information, or for, when the time indicated by the time information matches the time displayed by the clock, halting a supply of power to the reception section for a predetermined period of time even at a time at which time information is transmitted. As a result, the efficiency of a battery saving function can be enhanced and the possibility that an incorrect time will be displayed is reduced.

In addition, according to the present invention, a radio receiver for selective calling that periodically receives time information to correct time displayed by a clock comprises:

the clock;

a reception section for receiving, when powered on, an incoming signal and for demodulating the signal and outputting a resultant signal to a controller; and the controller for, upon receipt of the time information from the reception section, comparing the time information with the time displayed by the clock, and for, when a time indicated by the time information does not match the time displayed by the clock, correcting and adjusting the clock to reflect the time indicated by the time information, or for, when the time indicated by the time information matches the time displayed by the clock, halting use of time information for correction of the clock for a predetermined period of time, even if the time information is received from the reception section. As a result, the possibility that an incorrect time will be displayed is reduced.

Furthermore, according to the present invention, a radio receiver for selective calling that periodically receives time information to correct the time displayed by a clock comprises:

the clock;

a reception section for receiving, when powered on, an incoming signal and for demodulating the signal and outputting a resultant signal to a controller; and the controller for detecting, upon receipt of time information from the reception section, an error by using an error detection symbol that is added to the time information, for correcting, when the number of detected errors is not zero but is small enough to be detected, the errors and adjusting the clock to reflect the time indicated by the time information that is corrected, and for, when no errors are detected, correcting and adjusting the clock to reflect to the time indicated by the time information and halting a supply of power to the reception section for a predetermined period of time, even at a time at which time information is transmitted. As a result, the efficiency of a battery saving function can be enhanced and the possibility that an incorrect time will be displayed is reduced.

DETAILED DESCRIPTION OF THE PREFERRED EMBODIMENTS

First and second radio receivers for selective calling according to first and second embodiments of the present invention each compare time information received by a controller with the time displayed by an incorporated clock, and as a consequence of the result obtained, halt the correction of the clock for a while following the next receipt of time information, thereby enhancing the efficiency of a battery saving function and reducing the possibility that an incorrect time will be displayed.

Figure 1:
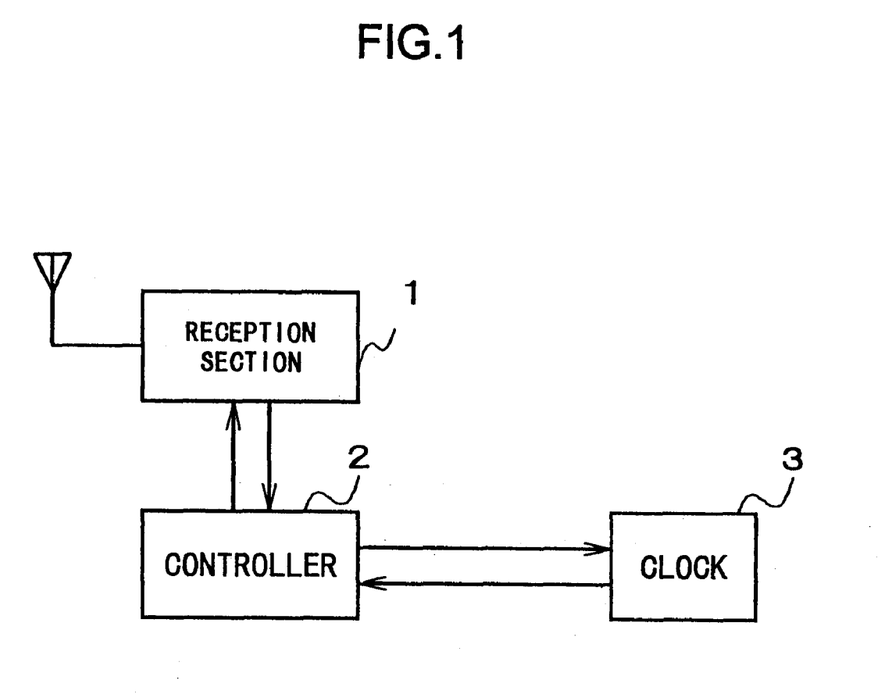
FIG. 1 is a block diagram illustrating the arrangement of a first radio receiver for selective calling.

FIG. 1 is a block diagram illustrating the arrangement of the first radio receiver. As is shown in FIG. 1, the first radio receiver comprises a reception section 1, a controller 2 and a clock 3.

While the first radio receiver also includes a display section and a console section, for simplification of the explanation they are not shown.

The individual sections will now be specifically explained. The reception section 1 is periodically powered on by a battery saving function of the controller 2, which will be described later, and receives a signal and outputs it to the controller 2.

The controller 2 periodically powers on the reception section 1 by using the battery saving function. Specifically, the controller 2 activates the reception section 1 at the time a frame for self-calling (e.g., frame "27") is received, and determines whether or not the call will be issued. When the calling is issued, the controller 2 receives the message and displays it.

In addition, the controller 2 has a flag, which indicates whether received time information should be compared with the time displayed by a clock 3, and a timer for counting a constant time, and performs a time correction that is the feature of the present invention. The time correction process will be described later in detail.

Further, the controller receives input signal from the reception section 1 and displays it, and also receives time from the clock 3 and displays it.

The clock 3 displays the time, and corrects the time in consonance with an adjustment instruction it receives from the controller. Also, in consonance with an instruction from the controller 2, the clock 3 outputs the time that is displayed to the controller 2.

The time correction process performed by the controller 2 will now be described while referring to the flowchart in FIG. 2, which describes the operation of the first radio receiver.

When the controller 2 is powered on, it clears the flag, the initial operation (S1).

The flag is in one of the logical states, "set" state or the "clear" state. In the "set" state, the flag indicates that received time information has recently been compared with the time displayed by the clock 3, and in the "clear" state, the flag indicates that the received time information has not recently been compared with the time displayed by the clock 3.

When the controller 2 has cleared the flag, it activates the reception section 1 to begin reception, and captures frame "0" to acquire synchronization with the frame (S2). Since this process is well known, it will not be explained in detail.

When synchronization is acquired, the flag is examined (S3). When it is found that the flag has been cleared (the flag is in the "clear" state (Yes)), a check is performed to determine whether or not a currently received frame is frame "0" (S4).

When, at procedure S4, it is found that the currently received frame is frame "0" (Yes), time information included in the frame is accepted (S5).

Following this, the controller determines whether or not the time information has been received (S6). When the time information has not yet been received (No), program control moves to procedure S12 which will be described later.

When, at procedure S6, the time information has been received (Yes), the time information is compared with the time displayed by the clock 3 (S7).

If, at procedure S7, the received time information does not match the time displayed by the clock 3 (No), the clock 3 is adjusted in accordance with the received time information (S9). At this time, the flag is not set.

The controller then moves to procedure S12.

If, at procedure S7, the received time information matches the time displayed by the clock 3 (Yes), the flag is set and the counting by the timer begins (S8). The clock 3 is adjusted in accordance with the received time information (S9). Program control then moves to procedure S12.

At this time (when the result at procedure S7 is Yes), it is also possible to skip procedure S9 and return to procedure S3.

When, at procedure S3, the flag has been set (the flag is in the "set" state), i.e., when the flag has not been cleared (No), a check is performed to determine whether the counting performed by the timer has been terminated (whether or not a time that is designated in advance has been counted) (S10). When the counting has been terminated (Yes), the flag is cleared (S11), and program control goes to procedure S12, which will be described later.

When, at procedure S10, the counting has not been terminated (No), procedure S11 by which the flag is cleared is not performed, and program control moves to procedure S12, which will be described later.

When, at procedure S4, the currently received frame is not frame "0" (No), program control goes to procedure S12 to perform a battery saving function.

A check is performed to determine whether or not the frame to be received is a frame for self-calling (S12). If the frame to be received is such a frame, it is received (S13) and program control returns to procedure S3. If the frame to be received is not such a frame, program control returns to procedure S3 without performing any processing.

The operation of the first radio receiver will now be described while referring to a timing chart, in FIG. 4, for explaining the time correction timing performed by the first radio receiver.

Figure 4A:
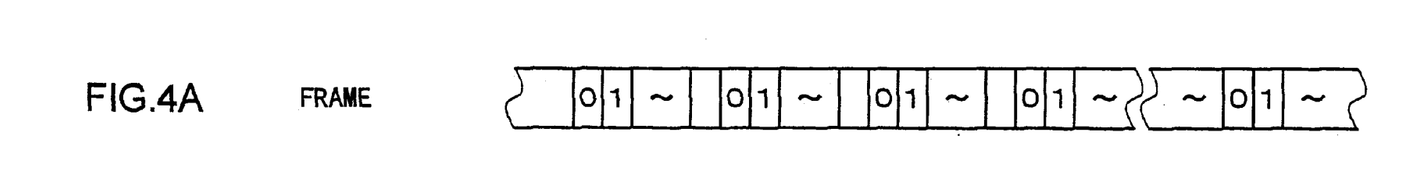
FIG. 4 is a timing chart for explaining the time correction timing for the first radio receiver.
Figure 4B:
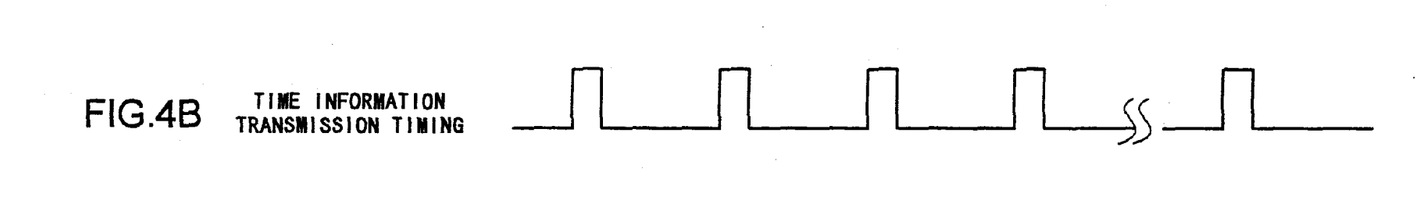
Figure 4C:
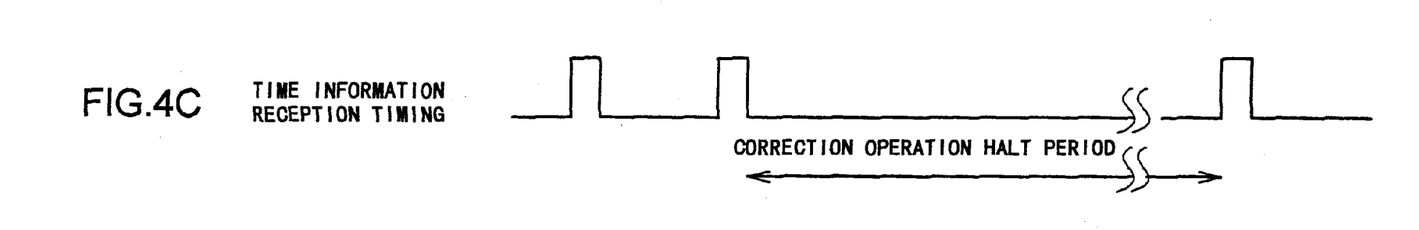

FIGS. 4A and 4B correspond to FIGS. 6A and 6B, and FIG. 4C is a timing chart for explaining the operation of the first radio receiver.

Although there is a timing for activating the reception section 1, even in a frame for self-calling, this portion is not shown.

Figure 2:
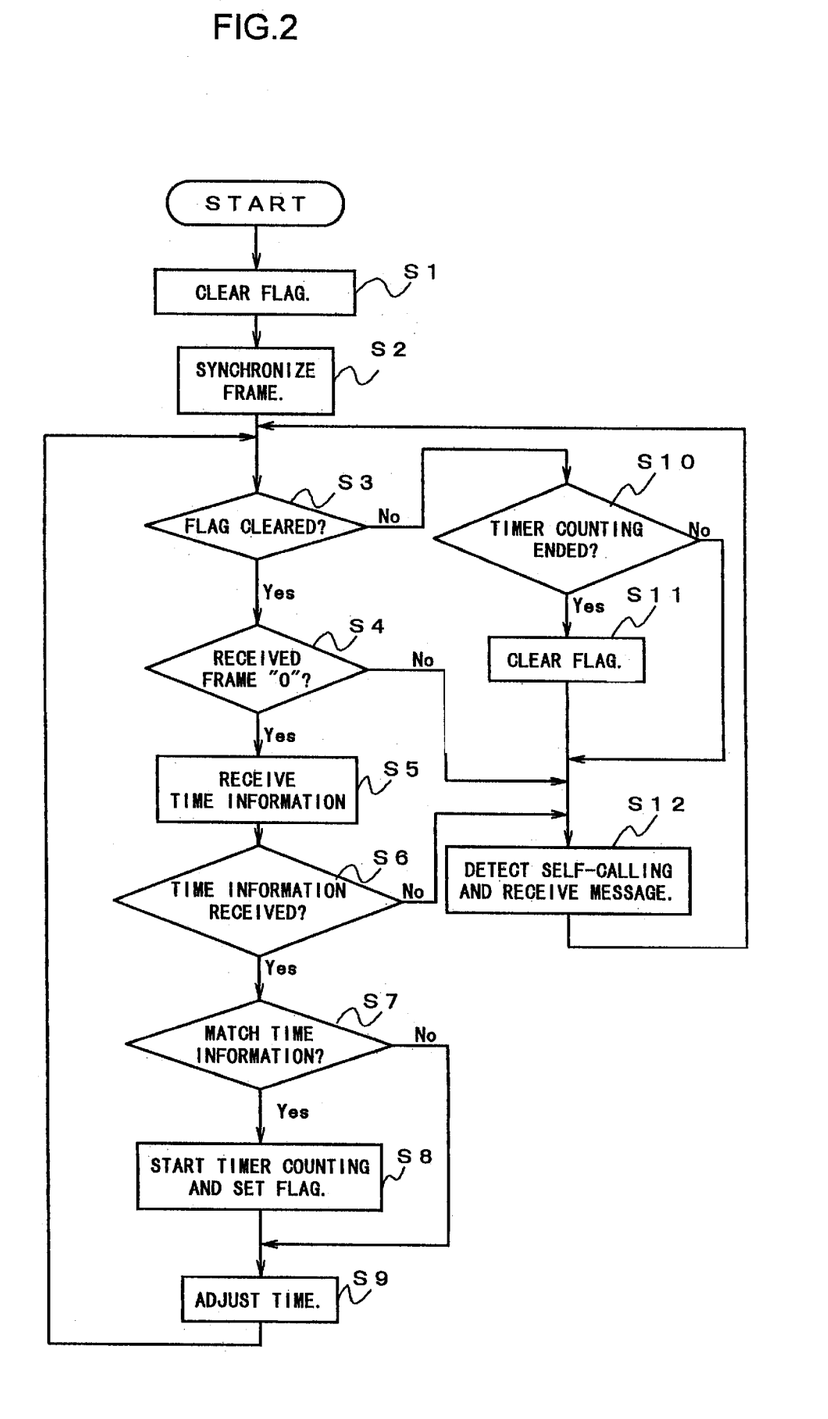
FIG. 2 is a flowchart showing processing performed by the first radio receiver.

First, immediately after the power is turned on, the flag is cleared, and after the frame is synchronously obtained, the controller 2 receives the time information included in frame "0" at procedures S4 to S6 in FIG. 2.

During this time, the controller 2 receives a frame for self-calling at procedures S12 and S13 in FIG. 2, and determines whether the radio receiver is being called. If it is the one that is being called, the message is accepted.

When the time information is received, it is compared with the time displayed by the incorporated clock 3. When the times do not match, procedure S9 is begin to correct the clock 3 and to adjust the time.

Since procedure S8 is skipped, the flag is not set and remains in the cleared state.

In addition, since the controller 2 returns to procedure S3 and the flag is in the cleared state, time information included in frame "0" is received at procedures S4 to S6. During this period, the controller 2 also receives a frame for self-calling at procedures S12 and S13, and determines whether the radio receiver is being called. When it is the one that is being called, the message is accepted.

When the time information is received at procedure S5, at procedure S7 the time information is compared with the time indicated by the incorporated clock 3. When the two times match, at procedure S8 the flag is set and counting for the clock 3 begins. The controller 2 moves to procedure S9 to correct the clock and to adjust the time.

Since the controller 2 returns to procedure S3 and the flag is set, at procedure S10 a check is performed to determine whether or not the counting for the clock 3 has been terminated. When the counting has not yet been terminated, at procedure S12 a frame for self-calling is received, and a check is performed to determine whether the radio receiver has been called. When this radio receiver has been called, only processing for accepting a message is performed.

Even if during this processing there is an opportunity to receive frame "0," the controller 2 does not turn on the reception section 1, so that time information is not received and a correction for the clock 3 is not performed. In FIG. 4C, this is called a "correction halt period."

When counting for the clock 3 has terminated, the flag is cleared at procedures S10 and S11, the receipt of time information included in frame "0" is begun, and the time for the clock 3 is corrected.

The first radio receiver does not correct the clock 3 each time a frame including time information is received, and does not accept a frame including time information for a specified period of time after the clock 3 has been corrected. As a result, the efficiency of a battery saving function can be improved.

During a specified period of time in which a frame including time information is not accepted, the clock 3 is so-called voluntarily driven. Even if incorrect time information is received during this period, that incorrect time is not used to adjust the clock 3. Further, when time information is received, it is compared with the time indicated by the clock 3 to determine whether or not the reception of time information should be halted for a specified period of time. Therefore, even when an incorrect time is displayed, it can be corrected the next time the correct time is received, so that the possibility that an incorrect time will be displayed is reduced.

Figure 3:
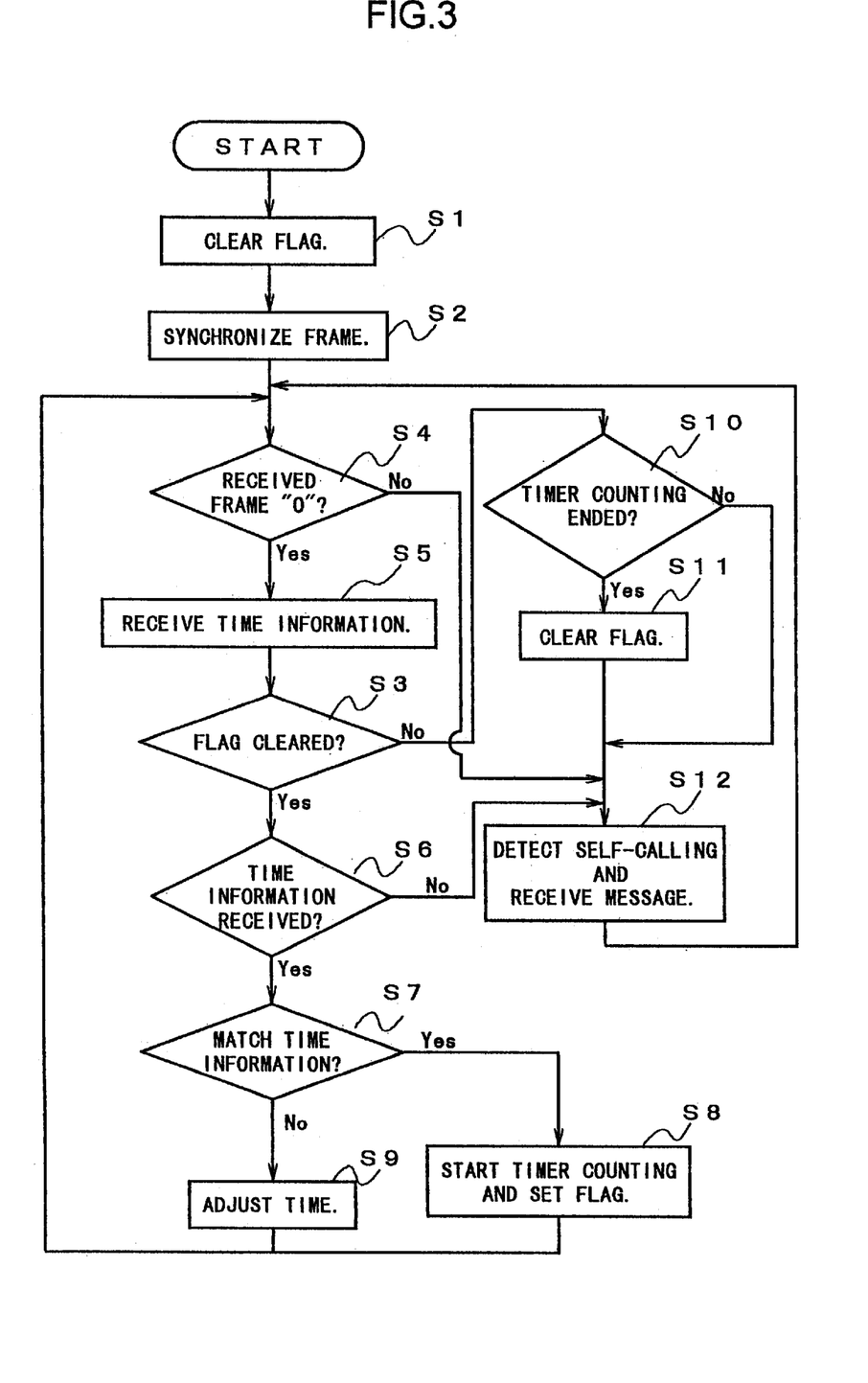
FIG. 3 is a flowchart showing other processing performed by the first radio receiver.

FIG. 3 is a flowchart showing another operation of the first radio receiver. As is shown in FIG. 3, while this processing is almost the same as that in the flowchart in FIG. 2, the controller 2 may perform procedures S4 and S5 before procedure S3. When, at process 7, time information and time displayed by the clock 3 match, the flag may be set to begin timer counting, and program control may skip procedure S9 and move to procedure S12.

More specifically, when time information is received by the reception section 1, the controller 2 compares the time information with the time displayed by the clock 3. When the two times match, the clocking by the timer is begun, and during a specified period of time, even when time information received by the reception section 1 is input to the controller 2, the controller 2 does not employ the time information to correct the clock 3.

At this time, since the time information is received each time, the battery saving effect is reduced; however, when the time information and the time displayed by the clock 3 match, time correction is not performed for a given period of time, so that the possibility that an incorrect time will be displayed is reduced.

The second radio receiver will now be described. The second radio receiver refers to an error detection symbol that is added to time information, and the correct time for a clock 3 when there is no error in time information, while it does not correct the time when in the time information there is an error. In this manner, the possibility that an incorrect time will be displayed is reduced.

While the second radio receiver can be implemented with the structure of the first radio receiver, the operation performed by a controller 2 differs slightly.

The operation of the controller 2 will now be described while referring to a flowchart in FIG. 5.

Figure 5:
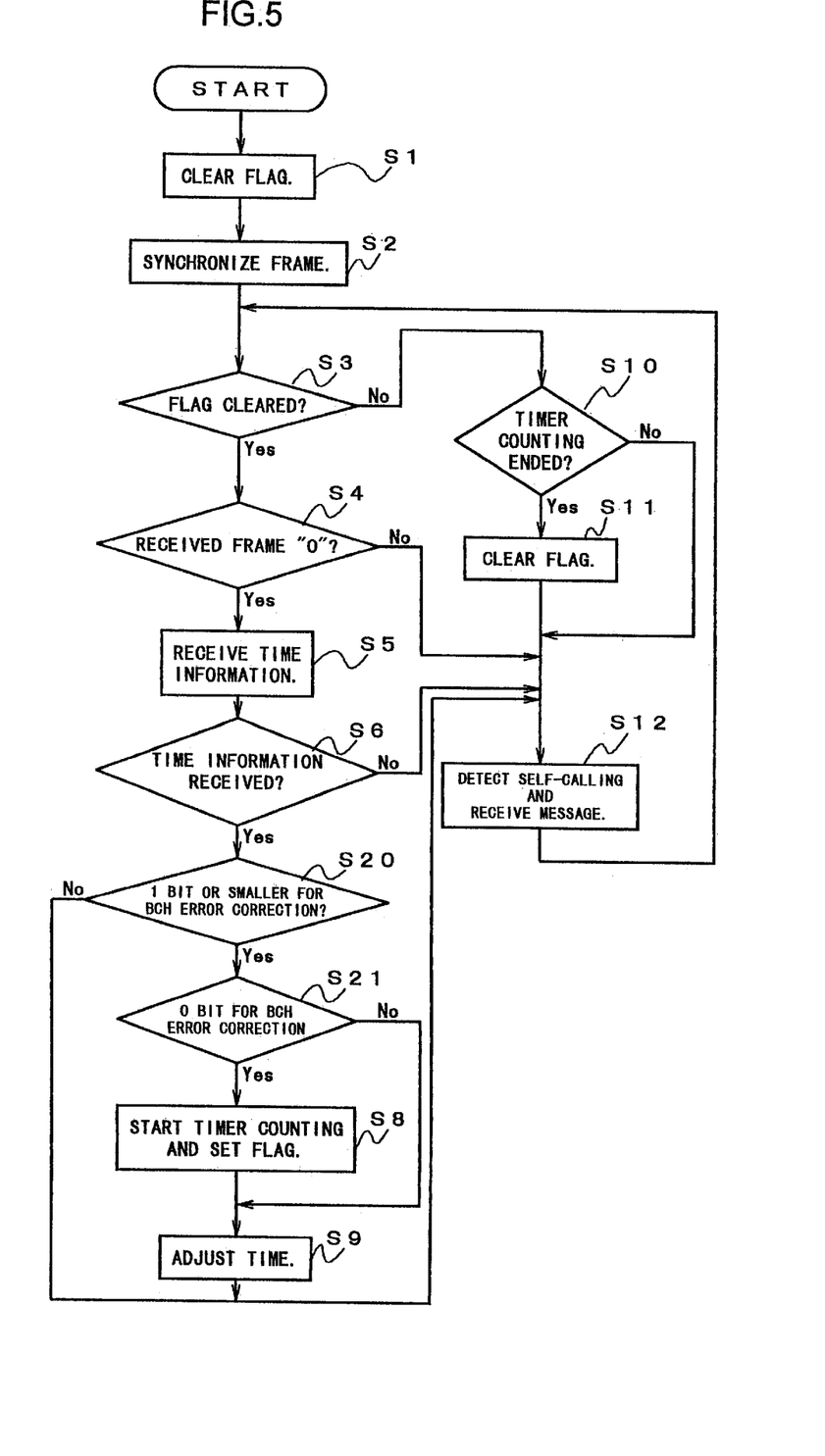
FIG. 5 is a flowchart showing the processing performed by a second radio receiver for selective calling.

As is shown in FIG. 5, procedures S1 to S6 of the second radio receiver are the same as those for the first radio receiver in FIG. 2, but procedure S7 and the following process differ. When, at procedure S6, time information is received (Yes), the second radio receiver examines an error detection symbol that is added to the time information to determine whether the number of errors is smaller than the number that is set in advance (S20).

In FIG. 5, a BCH error correction symbol is employed as an error detection symbol and the number of errors that is set is one bit.

That is, at procedure S20, a check is performed to determine whether BCH error correction is performed for one bit or less. When BCH error correction is performed for two bits or more (when BCH error correction is not for one bit or smaller, i.e., when the result is No), program control moves to procedure S12.

If, at procedure S20, BCH error correction is performed for one bit or less (Yes), a check is performed to determine whether error correction is for 0 bit (S21). When error correction is for 0 bit (Yes), the flag is set (S8), and hereinafter the processing is performed in the same manner as for the first radio receiver in FIG. 2.

When, at procedure S21, there is one bit for correction (No), program control skips procedure S8 and jumps to procedure S9. Hereinafter the same process is performed as is performed for the first radio receiver in FIG. 2. At this time, since the flag is not set, the reception of time information is begun at the next frame "0."

As well as the first radio receiver, the second radio receiver does not correct the clock 3 each time a frame including time information is received, and does not accept a frame including time information for a specified period of time after the time has been corrected. As a result, the efficiency of the battery saving function is improved.

In a specified period of time during which a frame including time information is not received, the clock 3 is so-called voluntarily driven. Even if incorrect time information is received during this period, the clock 3 is not adjusted in accordance with incorrect time. Further, when time information is received, error correction is performed, and in consonance with the result, the reception of time information is halted for a specified period of time. Therefore, the possibility that an incorrect time will be displayed is reduced.

The second radio receiver, as well as the first radio receiver, may perform procedures S4 and S5 before procedure S3 as shown in the flowchart in FIG. 5. And when a BCH error correction is 0 bit, a flag may be set to begin the counting by the timer, and program control may skip procedure S9 and jump to procedure S12.

In this case, since time information is received each time, the battery saving effect is reduced; however, the possibility that an incorrect time will be displayed is reduced.

According to the present invention, provided is a radio receiver for selective calling that corrects a clock in consonance with received time information, and halts receipt of time information for a specified period of time after a correction is performed. Thus, the efficiency of a battery saving function is enhanced, and even when time information indicating an incorrect time arrives in a period during which the receipt of time information is halted, a correct time will be displayed and the possibility that an incorrect time will be displayed is reduced.

In addition, according to the present invention, provided is a radio receiver for selective calling that has a clock and that compares periodically received time information with the time displayed by the clock, and, when the two times match, halts the reception of the time information for a predetermined period of time. As a result, the efficiency of a battery saving function can be enhanced, and even when time information indicating an incorrect time arrives in a period during which said reception of said time information is halted, a correct time can be displayed and the opportunity that an incorrect time will be displayed is reduced.

Further, according to the present invention, provided is a radio receiver for selective calling that has a clock and that periodically compares received time information with time displayed by said clock, and, when the two times match, does not perform time correction for a predetermined period of time. As a result, the efficiency of a battery saving function can be enhanced and the possibility that an incorrect time will be displayed is reduced.

Furthermore, according to the present invention, provided is a radio receiver for selective calling, that has a clock, that detects an error in periodically received time information, and that, when there is no error, halts the receipt of time information, or when an error in the time information is correctable, corrects it and adjusts the clock based on the corrected time information. As a result, the possibility that an incorrect time will be displayed is reduced.

Further, according to the present invention, provided is a radio receiver for selective calling, which comprises a reception section, a controller and a clock, wherein periodically received time information is compared with time displayed by a clock, and wherein, when the two times do not match, the clock is corrected, and when the two times match, a supply of power is halted to the reception section for a predetermined period of time, even at a time for transmission of time information. As a result, the efficiency of a battery saving function can be enhanced and the possibility that an incorrect time will be displayed is reduced.

In addition, according to the present invention, provided is a radio receiver for selective calling, which comprises a reception section, a controller and a clock, wherein periodically received time information is compared with time displayed by a clock, and wherein, when both times do not match, the clock is corrected, and when both times match, correction of the clock using time information is halted for a predetermined period of time, even if time information is received by the reception section. As a result, even when during the halt of the receipt of time information, there is an incoming time information indicating an incorrect time and the correct time can be displayed, so that the possibility that an incorrect time will be displayed is reduced.

Furthermore, according to the present invention, provided is a radio receiver for selective calling, which comprises a reception section, a controller and a clock, wherein errors are detected in periodically received time information, and wherein, when no errors are detected, the clock is corrected and the supply of power to the reception section is halted for a predetermined period of time even at a time for transmission of time information, and when the number of detected errors is not zero but is small enough to be corrected, these errors are corrected and the clock is adjusted. As a result, the efficiency of a battery saving function can be enhanced and the possibility that an incorrect time will be displayed is reduced.

What is claimed is:

1. A radio receiver for selective calling, the receiver comprising a clock displaying the time, the receiver having a single battery saving mode and periodically receiving time information and correcting the time displayed by said clock, wherein, when the time correction is preformed using only time information, subsequently received time information is not accepted for a predetermined period of time which is longer than the length of time from a correction of said time displayed by said clock to the next reception of said time information.

2. A radio receiver for selective calling, the receiver comprising a clock displaying the time, the receiver having a single battery saving mode and periodically receiving time information and correcting the time displayed by said clock, wherein said time information is compared with only said time displayed by said clock and wherein, when said time information matches said time of said clock, reception of said time information is halted for a predetermined period of time which is longer than the length of time from said comparison to the next reception of said time information, or when said time information does not match said time of said clock, said time displayed by said clock is corrected.

3. A radio receiver for selective calling, the receiver comprising a clock displaying the time, the receiver periodically receiving time information and correcting the time displayed by said clock by using a single battery saving mode, wherein said time information that is received is compared with only said time displayed by said clock, and wherein, when said time information matches said time of said clock, correction for said time displayed by said clock is not performed for a predetermined period of time which is longer than the length of time from said comparison to the next reception of said time information even if the next reception of time information includes correct time information, or wherein, when said time information does not match said time of said clock, said time displayed by said clock is corrected.

4. A radio receiver for selective calling, the receiver comprising a clock displaying the time, the receiver having a single battery saving mode and periodically receiving time information and correcting the time displayed by said clock, wherein said time information that is received is examined only to determine whether said time information contains an error, and wherein, when said time information contains an error that is large enough to require correction, said time information is corrected and said time of said clock is corrected based on the corrected time information, or wherein, when said time information contains no error, reception of said time information is halted for a predetermined period of time which is longer than the length of time from said examination to the next reception of said time information.

5. The radio receiver for selective calling according to claim 4, wherein a BCH error correction symbol is employed as an error detection symbol for detecting an error in time information that is received.

6. A radio receiver for selective calling, which periodically receives time information to correct time displayed by a clock and which uses a single battery saving mode, comprising:

said clock displaying the time;

a reception section for receiving, when powered on, an incoming signal including the time information and for demodulating said signal and outputting a resultant signal to a controller; and said controller for, upon receipt of said time information from said reception section, comparing said time information with only said time displayed by said clock, and for, when a time indicated by said time information does not match said time displayed by said clock, correcting and adjusting said clock to reflect said time indicated by said time information, or for, when said time indicated by said time information matches said time displayed by said clock, halting a supply of power to said reception section for a predetermined period of time which is longer than the length of time from said comparison to the next reception of said time information, such that time information is not accepted during the predetermined period of time even if said time information is received during that predetermined period of time and even if time information received during that predetermined period of time is correct.

7. A radio receiver for selective calling, which periodically receives time information to correct time displayed by a clock and which uses a single battery saving mode, comprising:

said clock displaying the time;

a reception section for receiving, when powered on, an incoming signal having the time information and for demodulating said signal and outputting a resultant signal to a controller; and said controller for, upon receipt of said time information from said reception section, comparing said time information with only said time displayed by said clock, and for, when a time indicated by said time information does not match said time displayed by said clock, correcting and adjusting said clock to reflect said time indicated by said time information, or for, when said time indicated by said time information matches said time displayed by said clock, halting use of time information for correction of said clock for a predetermined period of time which is longer than the length of time from said comparison to the next reception of said time information, such that time information is not accepted during the predetermined period of time even if said time information is received from said reception section during the predetermined period of time.

8. A radio receiver for selective calling, which periodically receives time information to correct the time displayed by a clock and which uses a single battery saving mode, comprising:

said clock displaying the time;

a reception section for receiving, when powered on, an incoming signal having the time information and for demodulating said signal and outputting a resultant signal to a controller; and said controller for detecting, upon receipt of said time information from said reception section, an error by using only an error detection symbol that is added to said time information, and for correcting, when the number of detected errors is above a threshold, said errors and adjusting said clock to reflect said time indicated by said time information that is corrected, and for, when no errors are detected, halting a supply of power to said reception section for a predetermined period of time which is longer than the length of time from said detecting to the next reception of said time information, such that time information is not accepted during the predetermined period of time even at a time at which correct time information is transmitted during the predetermined period of time.

9. The radio receiver for selective calling according to claim 8, wherein a BCH error correction symbol is employed as said error detection symbol for detecting an error in time information that is received.

* * * * *